(12) United States Patent
Wang et al.

(10) Patent No.: US 9,854,513 B2
(45) Date of Patent: Dec. 26, 2017

(54) METHOD AND NETWORK NODE FOR DETERMINING A RECOMMENDED CELL FOR A USER EQUIPMENT

(71) Applicant: Telefonaktiebolaget L M Ericsson (publ), Stockholm (SE)

(72) Inventors: MingXue Wang, Athlone (IE); John Keeney, Tullamore (IE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/758,492

(22) PCT Filed: Jan. 22, 2013

(86) PCT No.: PCT/EP2013/051095
§ 371 (c)(1),
(2) Date: Jun. 29, 2015

(87) PCT Pub. No.: WO2014/114322
PCT Pub. Date: Jul. 31, 2014

(65) Prior Publication Data
US 2015/0373637 A1    Dec. 24, 2015

(51) Int. Cl.
*H04W 48/20* (2009.01)
*H04W 48/12* (2009.01)

(52) U.S. Cl.
CPC ........... *H04W 48/20* (2013.01); *H04W 48/12* (2013.01)

(58) Field of Classification Search
CPC ............................. H04W 48/20; H04W 48/12
USPC ............... 455/134–135, 161.3, 277.2, 422.1, 455/435.2–444, 452.1–452.2; 370/331–333
See application file for complete search history.

(56) References Cited

U.S. PATENT DOCUMENTS

| | | | |
|---|---|---|---|
| 7,016,864 B1 | 3/2006 | Notz et al. | |
| 7,899,458 B2 | 3/2011 | Kakishima et al. | |
| 2006/0133330 A1 | 6/2006 | Chin | |
| 2009/0080381 A1 | 3/2009 | Yashar et al. | |
| 2010/0087195 A1* | 4/2010 | Lu ........................ | H04W 36/30 455/436 |
| 2010/0272050 A1 | 10/2010 | Lim et al. | |

(Continued)

FOREIGN PATENT DOCUMENTS

| | | |
|---|---|---|
| EP | 2034783 B1 | 10/2009 |
| JP | 2001209764 A | 8/2001 |

(Continued)

OTHER PUBLICATIONS

PCT International Search Report, dated Nov. 13, 2013, in connection with International Application No. PCT/EP2013/051095, all pages.

(Continued)

*Primary Examiner* — Michael Mapa
(74) *Attorney, Agent, or Firm* — Leffler Intellectual Property Law, PLLC (57) ABSTRACT

A cell is recommended to a first user equipment for selection during its cell selection process, wherein the recommendation is based on a performance parameter between the cell and a second user equipment, wherein the recommendation is based on a determined degree of similarity between the first user equipment and the second user equipment.

13 Claims, 8 Drawing Sheets

(56) References Cited

U.S. PATENT DOCUMENTS

| | | | |
|---|---|---|---|
| 2012/0014357 A1* | 1/2012 | Jung | H04L 5/0035 370/332 |
| 2012/0196644 A1* | 8/2012 | Scherzer | H04W 72/02 455/524 |
| 2012/0225657 A1* | 9/2012 | Watanabe | H04W 36/0055 455/436 |
| 2012/0297055 A9* | 11/2012 | Raleigh | H04W 36/245 709/224 |
| 2013/0086082 A1* | 4/2013 | Park | G06F 17/30867 707/748 |
| 2014/0071856 A1* | 3/2014 | Brisebois | H04W 56/00 370/255 |

FOREIGN PATENT DOCUMENTS

| | | |
|---|---|---|
| JP | 4070924 B2 | 4/2008 |
| JP | 4404410 B2 | 1/2010 |
| KR | 2006 0130429 A | 12/2006 |

OTHER PUBLICATIONS

Roessler, A. "Cell search and cell selection in UMTS LTE Application Note" Rohde & Schwarz, Sep. 2009, pp. 1-40.

Amzallag, D. et al. "Cell Selection in 4G Cellular Networks" Proceedings of IEEE INFOCOM 2008, IEEE, pp. 1-9.

Lee, J.C. et al. "Intelligent cell selection satisfying user requirements for inter-system handover in heterogeneous networks" Computer Communications 35 (2012), Elsevier, pp. 2106-2114.

Komine, T. et al. "A Proposal of Cell Selection Algorithm for LTE Handover Optimization" 2012 IEEE Symposium on Computers & Communications (ISCC) Jul. 1-4, 2012, IEEE, pp. 37-42, ISBN: 978-1-4673-2712-1.

* cited by examiner

METHOD AND NETWORK NODE FOR DETERMINING A RECOMMENDED CELL FOR A USER EQUIPMENT

TECHNICAL FIELD

This invention relates to a method and apparatus for selecting a cell for a user equipment.

BACKGROUND

In a mobile telecommunications network, a user equipment connects to a cell (also known as "camping" or "pairing") to access the network and use the network service. As the network typically includes a plurality of cells, cell selection is a process of selecting the most appropriate cell for a user equipment to connect to. It is important to optimize the cell selection process in order to improve the quality of the service, both from the point of view of the network service provider and the customer. For example, while operating according to individual operation-level and business-level priorities, network service providers generally aim to maximize the number of satisfied customers at any given point by ensuring that user equipments are connected to the most appropriate cell, thus maximizing the quality of the network service.

A user equipment initially connects to a network by cell selection, but also periodically reconnects to the network (e.g. via the same or another cell) to maintain a quality service. This reconnection process is sometimes referred to as 'cell reselection', but is covered by the term 'cell selection' at least for the purposes of this description.

The cell selection process involves the user equipment using a cell selection algorithm to connect to a high priority cell. Thus, when the initial cell selection process starts, a cell selection algorithm is performed and the user equipment connects to the highest priority cell.

Subsequently, the user equipment periodically uses the cell selection algorithm to determine a high priority cell (or list of cells), and connects to the high priority cell during reconnection. The user equipment monitors paging and system information from the cell and performs radio measurements and monitoring, and uses this information when performing the cell selection algorithm.

The cell selection process is generally started by the user equipment, but can be influenced by another network node (e.g. the network management system (Base Station Controller)), to encourage or direct the user equipment to connect to a specific cell. This may occur when the network service provider is balancing network load, directing a user equipment to connect to an operator-specific cell, or to avoid "ping-ponging", for example.

Various cell selection algorithms have been developed for cell selection, such as described in "Cell Selection in 4G Cellular Network", IEEE International Conference on Computer Communications, 2008, Amzallag, D., et al.; "Cell Search and Cell Selection in UMTS LTE" application note reference 1MA150_0E, 2009, available from http://www2.rohde-schwarz.com/file_12728/1MA150_0E.pdf; "Intelligent Cell Selection Satisfying User Requirements for Inter-System Handover in Heterogeneous Networks", Computer Communications, 2012, Lee. J. C. & Yoo, S. M.; and "A Proposal of Cell Selection Algorithm for LTE Handover Optimization" in IEEE Symposium on Computers and Communications, 2012, Komine T., Yamamoto, T., & Konishi, S. However, there are problems with these existing cell selection algorithms.

Firstly, these algorithms tend to give a disproportionate preference to cells in close spatial relationship with the user equipment. This can lead to load-balancing issues when a large number of user equipments congregate in a small area (e.g. a city centre), when neighbouring or overlapping cells may have been able to provide an adequate service to the user equipments.

Secondly, some of the cell selection algorithms use quality or experience based approaches, which rely on data between the user equipment and the cell. However, if the user equipment has never connected to the particular cell before, (e.g. it is new to a network, has switched providers, or has 'roamed' into the network) then that information will not be available and the cell selection algorithm becomes inaccurate.

Furthermore, such quality or experience based approaches assume that the user equipment's past information remains static and therefore relevant to future cell selections. However, this is not a reliable assumption as most modern user equipments are customizable and upgradable, and cell parameters are reconfigurable and often adaptive.

Thirdly, some cell selection algorithms are based on instantaneous data alone (rather than using past quality information). However, this can be inappropriate as the instantaneous information may not be accurate when considered over a longer period of time. Thus, a user equipment may select a cell based on the data applicable during the cell selection process, but that cell may quickly become unsuitable and the user equipment remains camped on the cell until cell reselection.

Fourthly, some alternative cell selection algorithms require modification of the user equipment, the parameters broadcast by the cell basestations, or the parameters of the signalling protocols between cells and the user equipments. However, this is unlikely to be appropriate in strictly standardized mobile telecommunications environments, particular when the radio operations of the user equipment is based on regulated commodity hardware.

It is therefore desirable to alleviate some or all of the above problems.

SUMMARY

According to a first aspect of the invention, there is provided a method of recommending a cell for selection by a first user equipment, the method comprising the step of determining a recommended cell for the first user equipment based on a performance parameter of a second user equipment with the cell.

The present invention therefore provides a method of recommending a cell for selection by a first user equipment (such that the first user equipment may then connect to the recommended cell) based on a performance parameter of another user equipment. In one example, the method may recommend a cell to a first user equipment having just roamed into a new network, the recommendation being based on a performance parameter between a similar user equipment with that particular cell. Thus, the cell selection process is improved for user equipments having no past performance information with any of the cells in a new network.

In another example, if a similar user equipment has a very high connection reliability parameter with a particular cell, the first user equipment would likely experience similar reliability with that particular cell (as similar classes of user equipments tend to have similar performance characteristics). Accordingly, that cell is recommended to the first user equipment, which may then be selected during the cell selection process.

The present invention therefore provides a more flexible and adaptable cell selection process, as it does not simply emphasize signal strength and spatial proximity as in existing cell selection algorithms (which thus improves load-balancing). Instead, the recommended cell may be based on any desired performance parameter (or Key Performance Indicator, KPI). This provides greater adaptability, and new or emerging criteria may be used as the performance parameter. For example, if high data transfer speed, consistent throughput, or low latency achieved, etc are used as part of the performance parameter, the first user equipment will be recommended a cell which experiences a high peak transfer speed, consistent throughput or low latency with another user equipment. If the other user equipment is similar to the first user equipment, then the first user equipment will probably experience the same performance with that cell. If the network service provider selects other business priority ranking parameters (e.g. power usage, load balancing, load centralization), then associated business level metrics can be improved.

Depending on the ranking criteria used, the present invention provides a more consistent user experience whilst the first user equipment is connected to the recommended cell. This reduces the frequency of cell selection, thus reducing signalling traffic and potential for connection disruptions.

The similarity between the first and second user equipment may be based on a similarity measure, such as Cosine-based similarity.

The performance parameter may be a past performance parameter of the second user equipment with the cell. Thus, a cell may be recommended to the first user equipment based on past experience of a similar user equipment with the cell, such that it is not relying on instantaneous data, which increases the likelihood that a cell is selected for improved long-term performance.

The first and second user equipment may be both of a plurality of user equipments, and the cell may be one of a plurality of cells, and the step of determining a recommended cell for the first user equipment includes determining a recommended plurality of cells for the first user equipment based on performance parameters of each of the plurality of user equipments with each of the plurality of cells. The method may therefore involve producing a matrix of performance parameter calculations between each of the plurality of user equipments and each of the plurality of cells.

The method may therefore involve the first user equipment receiving a list of recommended cells, and the first user equipment may connect to any one of the recommended cells after performing a cell selection algorithm to identify possible cells and selecting one of the possible cells having the highest recommendation in the list of recommended cells.

The performance parameter for any one of the plurality of user equipments with any one of the plurality of cells may be predicted. Thus, if a performance parameter between any one of the plurality of user equipments and any one of the plurality of cells cannot be calculated (e.g. if the user equipment is new to a network and therefore has no past performance data), it may be predicted based on performance parameters between similar (or identical) user equipments with the same (or similar) cells.

The step of determining a recommended plurality of cells for the first user equipment may be based on performance parameters of a first selection of the plurality of user equipments, wherein each user equipment in the first selection of the plurality of user equipments may have performance parameters with a plurality of candidate cells. The accuracy of the recommendation may therefore be significantly improved when a first selection of the plurality of user equipments is used to compile the recommended plurality of cells, wherein the first selection of the plurality of user equipments has calculated performance parameters with at least a predetermined number of candidate cells. Preferably, each user equipment in the first selection of the plurality of user equipments has performance parameters with at least five candidate cells.

The recommended plurality of cells may be ranked according to the similarity between each of the first selection of the plurality of user equipments with the first user equipment. Thus, the recommended plurality of cells may be ranked according to their similarity, which improves the likelihood that the most highly ranked recommended cell in the recommended plurality of cells is the most appropriate cell for the first user equipment.

The first selection of the plurality user equipments may include the ten most similar user equipments to the first user equipment. The accuracy of the recommendation is significantly improved when the top-ten most similar user equipments are considered when ranking the recommended plurality of cells for the first user equipment.

The method may further comprise the step of filtering the recommended plurality of cells according to the first user equipment's activity. Thus, the recommended plurality of cells may be filtered to remove cells which the first user equipment is unlikely to connect to (e.g. due do the distance between the first user equipment and the cell). The recommended plurality of cells may be filtered based on the first user equipment's recent activity (e.g. a week, a month, etc).

The method may further comprise the step of influencing the first user equipment to select the recommended cell. Thus, the recommended cell or recommended plurality of cells may be sent to the first user equipment. The first user equipment may select the recommended cell or one of the recommended plurality of cells after performing a cell selection algorithm.

The performance parameter may be configured to decay at a predetermined rate. Thus, the performance parameters may account for the fact that performance parameters between cells and user equipments change over time (such that data may not be relevant at a future point in time).

A computer program product comprising computer executable code which when executed on a computer causes the computer to control a node may perform the method according to the first aspect of the invention.

According to a second aspect of the invention, there is provided a network node for recommending a cell for selection by a first user equipment, the network node comprising a processor configured for determining a recommended cell for the first user equipment based on a performance parameter of a second user equipment with the cell.

BRIEF DESCRIPTION OF THE DRAWINGS

Embodiments of the invention will now be described, by way of example, and with reference to the drawings in which.

DETAILED DESCRIPTION

Figure 1A:
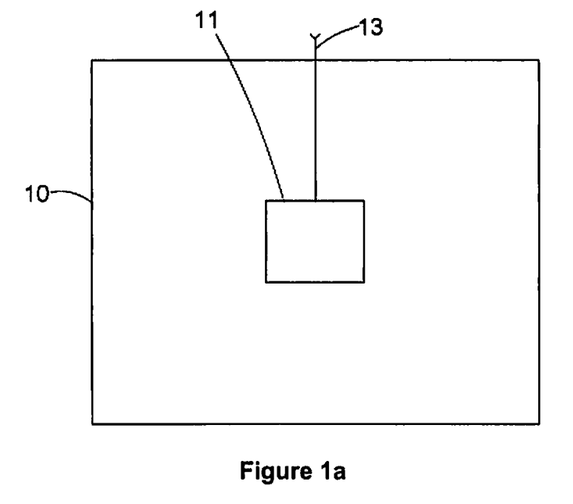
FIG. 1a is a schematic diagram illustrating a network node according to an embodiment of the present invention.
Figure 1B:
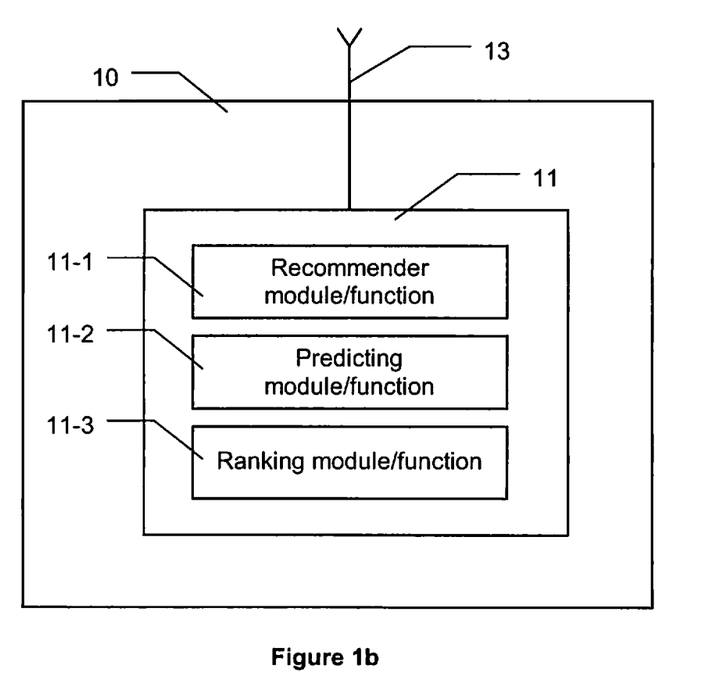
FIG. 1b is a schematic diagram illustrating a network node according to an embodiment of the present invention.

An embodiment of a network node 10 according to the present invention will now be described with reference to FIGS. 1a and 1b. The network node 10 includes at least a processor 11 and an antenna 13 (operating as a communications interface).

Figure 2:
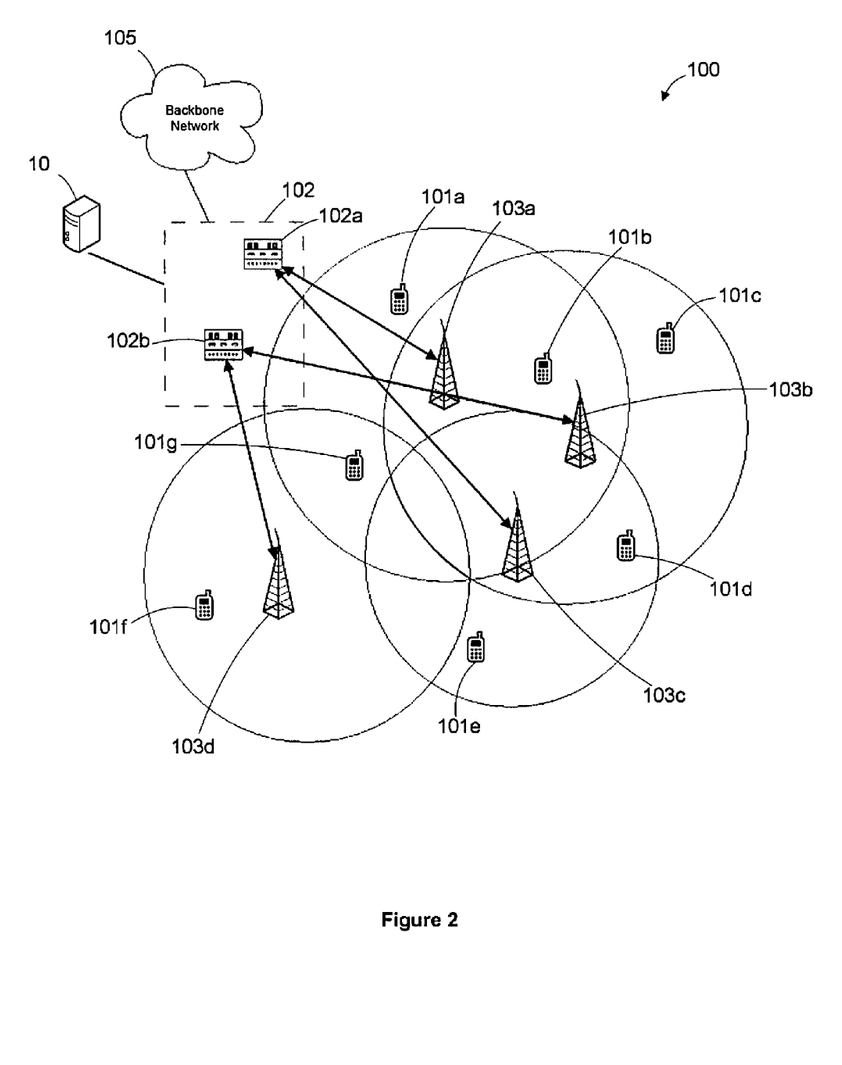
FIG. 2 is a schematic diagram illustrating a network including the network node of FIG. 1a or 1b.

FIG. 2 illustrates a network 100, including the network node 10, a plurality of cells 103a ... 103d, a plurality of user equipments 101a ... 101g, a support system 102 (including a GPRS support node (SGSN) 102a and Mobility Management Entity (MME) 102b). In this embodiment, each user equipment in the plurality of user equipments 101a ... 101g is a mobile device (such as a mobile telephone), and has an International Mobile Subscriber Identity (IMSI) acting as a unique identifier. The plurality of cells 103a ... 103d provide services (such as voice calls, video calls and Internet) to the plurality of user equipments 101a ... 101g. The support system 102 acts between the plurality of cells and a backbone network 105, or between the radio access network and the core network. The support system 102 monitors links between each user equipment in the plurality of user equipments 101a ... 101g and each cell in the plurality of cells 103a ... 103d.

In this embodiment, the SGSN stored location information (e.g. the current cell for a user equipment) and user profiles (e.g. IMSI, addresses used in the packet data network) of all user equipments monitored by the support system 102. The antenna 13 of the network node 10 acts as a communications interface to receive data from the support system 102.

The network node 10 includes a processor 11 configured to recommend a cell 103a of the plurality of cells 103a ... 103d to a first user equipment 101a of the plurality user equipments 101a ... 101g, based on the performance parameter of a second user equipment 101b of the plurality of user equipments 101a ... 101g with that cell 103a. The method for recommending a cell will now be described in more detail with reference to FIG. 3. In one embodiment the operation of recommending a cell is performed by a recommending module or function 11-1 operating in the processor 11.

Figure 3:
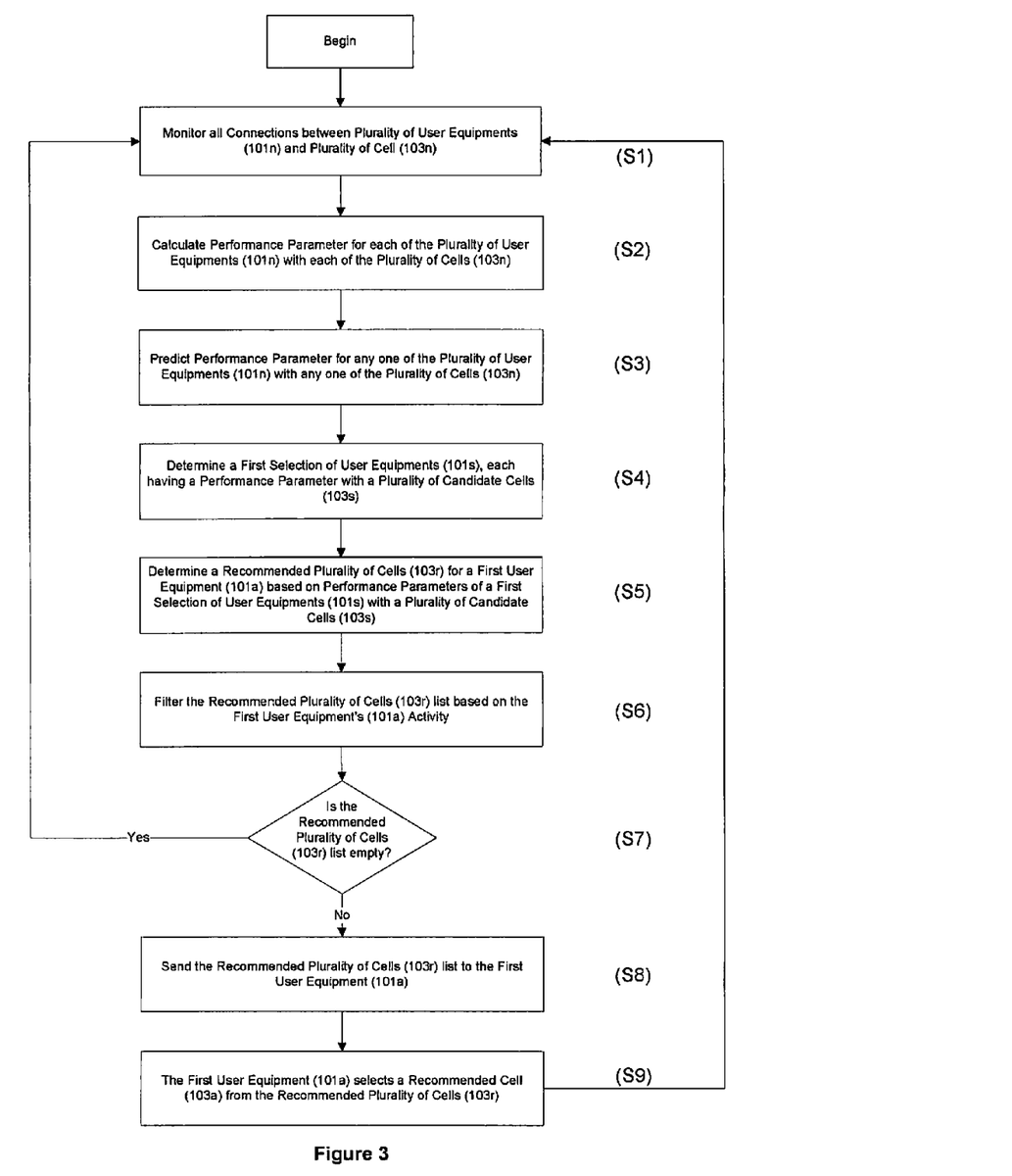
FIG. 3 is a flow diagram illustrating a method according to an embodiment of the present invention.

As a first step (step S1), connections between the plurality of user equipments 101a ... 101g and the plurality of cells 103a ... 103d are monitored. Data relating to the connections is forwarded to the network node 10. In this embodiment, the support system 102 (e.g. the SGSN/MME) collects data relating to the connections between the plurality of user equipments 101a ... 101g and the plurality of cells 103a ... 103d, and this is sent to the network node 10.

The support system 102 data includes information on events used to notify the Network Management System that a user equipment has connected to a cell or a data or voice connection has been initiated between the user equipment and the mobile network. These events also include data relating to when and how a user equipment and cell connection succeeds or fails. The support system 102 data may therefore be used to calculate a performance parameter between a user equipment of the plurality of user equipments 101a ... 101g and a cell of the plurality of cells 103a ... 103d.

In this embodiment, the performance parameter used for recommending a cell is a 'connection reliability' parameter. The connection reliability parameter, r_uc, between a user equipment, U, and a cell, C, may be defined by the following equation:

$$r\_uc = 1 - \frac{(\text{number of failures between user equipment } (U) \text{ and cell } (C))}{(\text{number of attempted connections between user equipment } (U) \text{ and cell } (C))}$$

The processor is configured to produce a matrix of performance parameter values between every user equipment in the plurality of user equipments 101a ... 101g and every cell in the plurality of cells 103a ... 103d (step S2). For example, if there are m user equipments and n cells, then a m*n matrix can be created, wherein each entry in the matrix represents the performance parameter value between that user equipment with that cell:

|      | 103a | 103b | 103c  | 103d | ... |
|------|------|------|-------|------|-----|
| 101a | 0.82 | 0.32 | N/A   | 1.0  | ... |
| 101b | 0.91 | N/A  | 0.991 | 0.96 | ... |
| 101c | 0.73 | 0.23 | N/A   | 0.91 | ... |
| ...  | ...  | ...  | ...   | ...  | ... |

If a performance parameter between a user equipment and a cell cannot be calculated (e.g. that user equipment has never connected or attempted to connect to that cell before), then the matrix entry between the pair is populated with a 'N/A' entry. In this case, the performance parameter between that user equipment with that cell may be predicted (step S3). In one embodiment the operation of predicting the performance parameter may be performed in a predicting module or function 11-2 of the processor 11.

The performance parameter may be predicted in at least two possible ways. In one option, the performance parameter between a user equipment and a cell may be predicted based on the performance parameters between similar user equipments with that cell. Thus, a neighbourhood of similar user equipments is found, and the performance parameters between the neighbourhood of similar user equipments with that cell are aggregated (e.g. as a weighted sum or regression) to form a predicted performance parameter. In another option, the performance parameter between a user equipment and a cell may be predicted based on the performance parameters of similar cells with that user equipment. Thus, a neighbourhood of similar cells is found, and the performance parameters between the neighbourhood of similar cells with that user equipment are aggregated (e.g. as a weighted sum or regression) to form a predicted performance parameter. The matrix may then be completed with the calculated and predicted performance parameters between each user equipment in the plurality of user equipments 101*a* . . . 101*g* and each cell in the plurality of cells 103*a* . . . 103*d*.

Figure 4A:
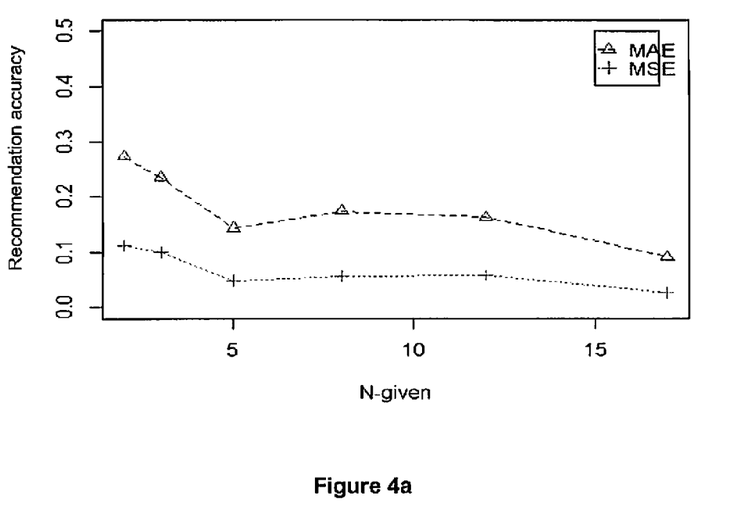
FIG. 4a is a graph illustrating the recommendation accuracy against the predetermined number of candidate cells required for a user equipment to be part of the first selection of the plurality of user equipments.

In this embodiment, a recommended plurality of cells 103*r* (i.e. a list of recommended cells) is produced based on the matrix of performance parameters. In this embodiment, a first selection 101*s* of the user equipments of the plurality of user equipments 101*a* . . . 101*g* is chosen, wherein each user equipment in the first selection 101*s* has a calculated (rather than predicted) performance parameter with at least five candidate cells. By selecting user equipments having a greater ratio of calculated to predicted data, the accuracy of the overall recommendations is increased significantly. This is illustrated in the graph of FIG. 4*a*.

Figure 4B:
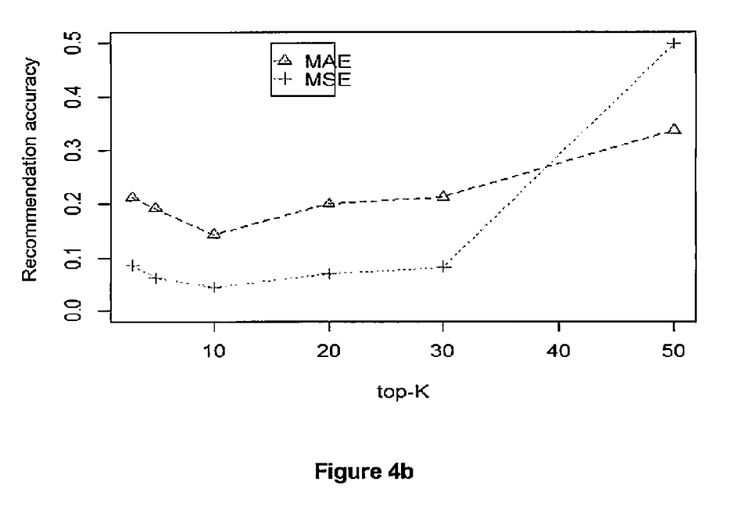
FIG. 4b is a graph illustrating the recommendation accuracy against the number of ranked cells in the recommended plurality of cells.

As a next step (step S5), the first selection 101*s* of user equipments is used to produce a recommended plurality of cells 103*r*. In this embodiment, a User Based Collaborative Filtering method is used, such that the processor 11 ranks candidate cells based on the performance parameters of the top-ten most similar user equipments. In one embodiment the ranking operation is performed by a ranking module or function 11-3 of the processor 11. Thus, an aggregated performance parameter for a cell is produced based on the performance parameters with each of the top-ten most similar user equipments with that cell, and the recommended plurality of cells 103*r* is ranked according to the highest aggregated performance parameter for each cell. As shown in FIG. 4*b*, by using the top-ten most similar user equipments, the accuracy of the overall recommendations is increased significantly.

In the above description, the 'similarity' between user equipments and cells may be calculated using a Cosine-based similarity algorithm. This algorithm will now be described in more detail, although the skilled person would understand that other forms of similarity measure may be used, such as those used in collaborative filtering recommender systems.

In one example, the similarity is measured by taking service quality measurements between a plurality of cells (in this example, five cells) and a plurality of user equipments (in this example, three user equipments). A data vector is constructed for each user equipment. For example, for the first user equipment, the data vector for its service quality with the five cells is [0.75, 0.63, 0.68, 0.32, 1]; for the second user equipment, the data vector for its service quality with the five cells is [0.98, 0.52, 0.99, 0.78, 0.76]; and for the third user equipment, the data vector for its service quality with the five cells is [0.66, 0, 0.87, 0.94, 0.21].

These data vectors can be used in a Cosine-based similarity algorithm to determine the similarity between each user equipment with every other user equipment. The cosine of the angle between two data vectors, A and B, for any two of the user equipments is $$\cos(\theta) = \frac{A \cdot B}{\|A\|\|B\|}$$

where $$\|A\| = \sqrt{\sum_{i=1}^{n} a_i^2}$$

where $a_i$ is the ith component of the vector A. The cosine of the angle between two data vectors for two of the user equipments gives a measurement of the similarity between them.

The skilled person will understand that this method may be applied to determine similar user equipments and similar cells to a respective user equipment or cell, or when determining a subset of most similar user equipments (as described above). The skilled person will also understand that other similarity measurements techniques may be used, such as Correlation-based similarity.

The skilled person will understand that there may be a very large number of cells in the recommended plurality of cells. Therefore, in this embodiment, the recommended plurality of cells 103*r* is filtered based on the first user equipment's activity (step S6), such that any cells which the user equipment is highly unlikely to connect to (e.g. due to the distance between the cell and the user equipment) are removed from the recommended plurality of cells 103*r*.

As a next step (step S7), it is determined whether the recommended plurality of cells 103*r* contains any recommended cells or if it is empty. If it is empty, then the method reverts to step S1 (the connections between each user equipment and each cell are monitored). If not, then the recommended plurality of cells 103*r* is sent to the first user equipment (step S8). In this embodiment, the recommended plurality of cells 103*r* is sent as a Preferred Roaming List (PRL) or as other formats to other management systems.

Figure 5:
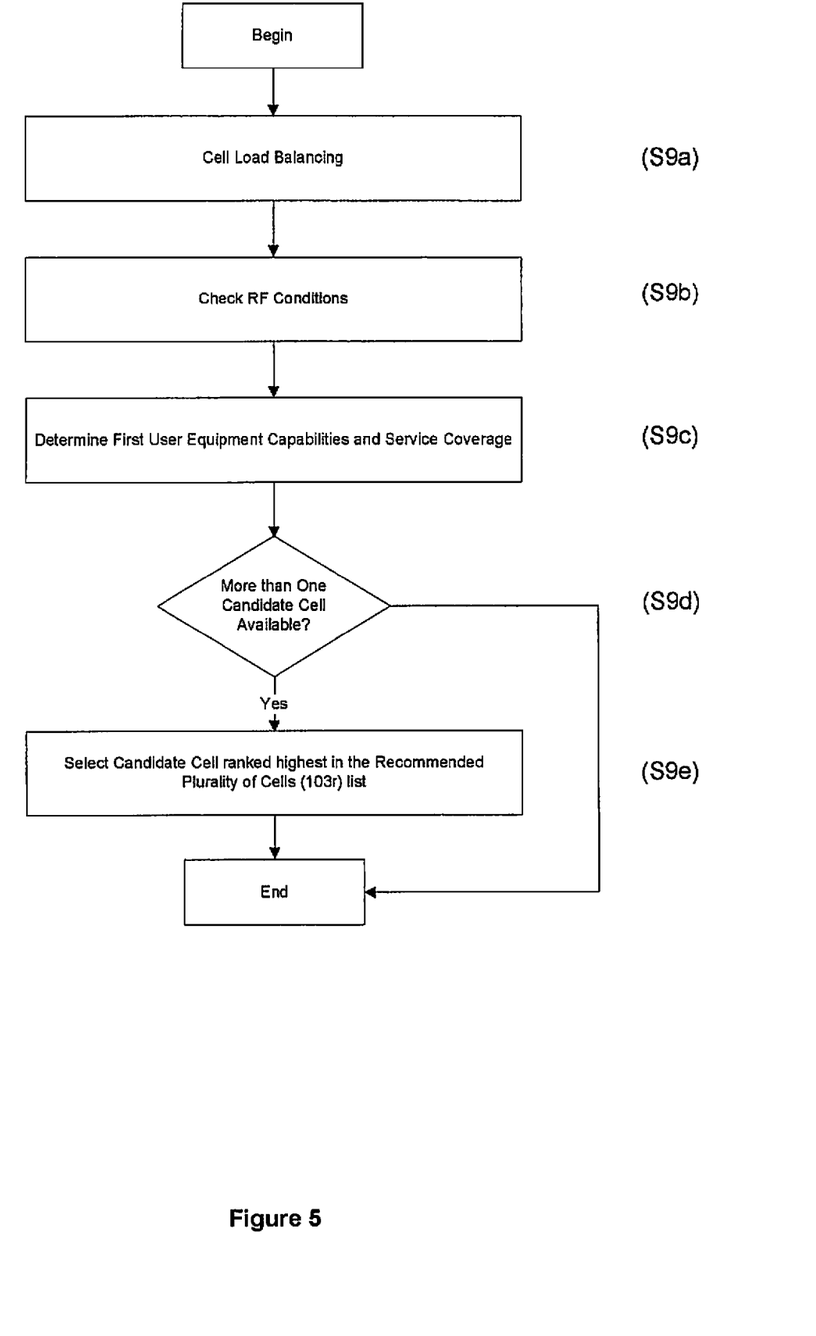
FIG. 5 is a flow diagram illustrating the step of performing a cell selection algorithm and selecting a cell ranked highest in the recommended plurality of cells.

The first user equipment 103*a* may then select a cell from the recommended plurality of cells 103*r* (step S9). In this embodiment, the method compliments existing cell selection algorithms (as shown in FIG. 5), such that if after performing cell load balancing, RF condition checking, and determining first user equipment capabilities and service coverage there are multiple cells available for selection, the first user equipment 103*a* selects a cell ranked highest in the recommended plurality of cells 103*r*.

Figure 6:
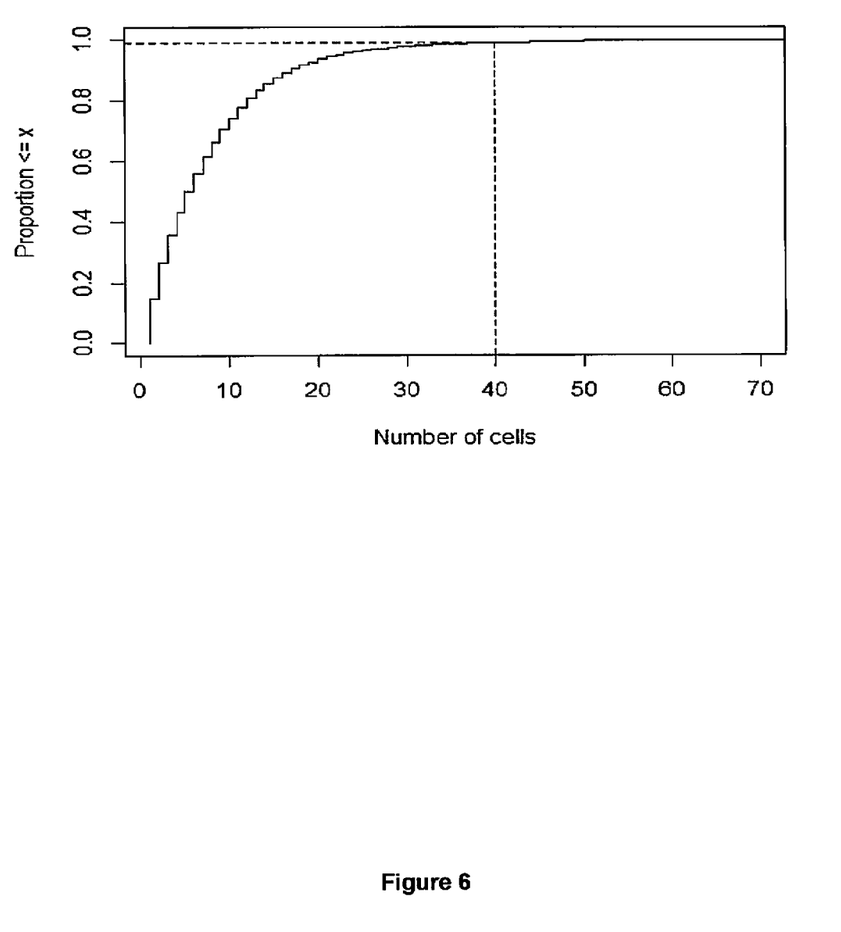
FIG. 6 is a graph illustrating the cumulative distribution function of the number of different cells used by each user equipment in a test sample.

The step of filtering the recommended plurality of cells 103*r* based on the first user equipment's 103*a* activity will now be described in more detail with reference to FIGS. 6 to 8. FIG. 6 is a graph illustrating a cumulative distribution function of the number of different cells used by each user equipment in a real data set. Typically, more than 99% of all user equipments are connected to less than forty different cells (approximately 1% of all cells). Hence, the recommended plurality of cells 103*r* for a first user equipment 103*a* is filtered to reduce its size. This reduces the size of the PRL, and ensures that the time taken to search the recommended plurality of cells 103*r* is minimized.

Figure 7:
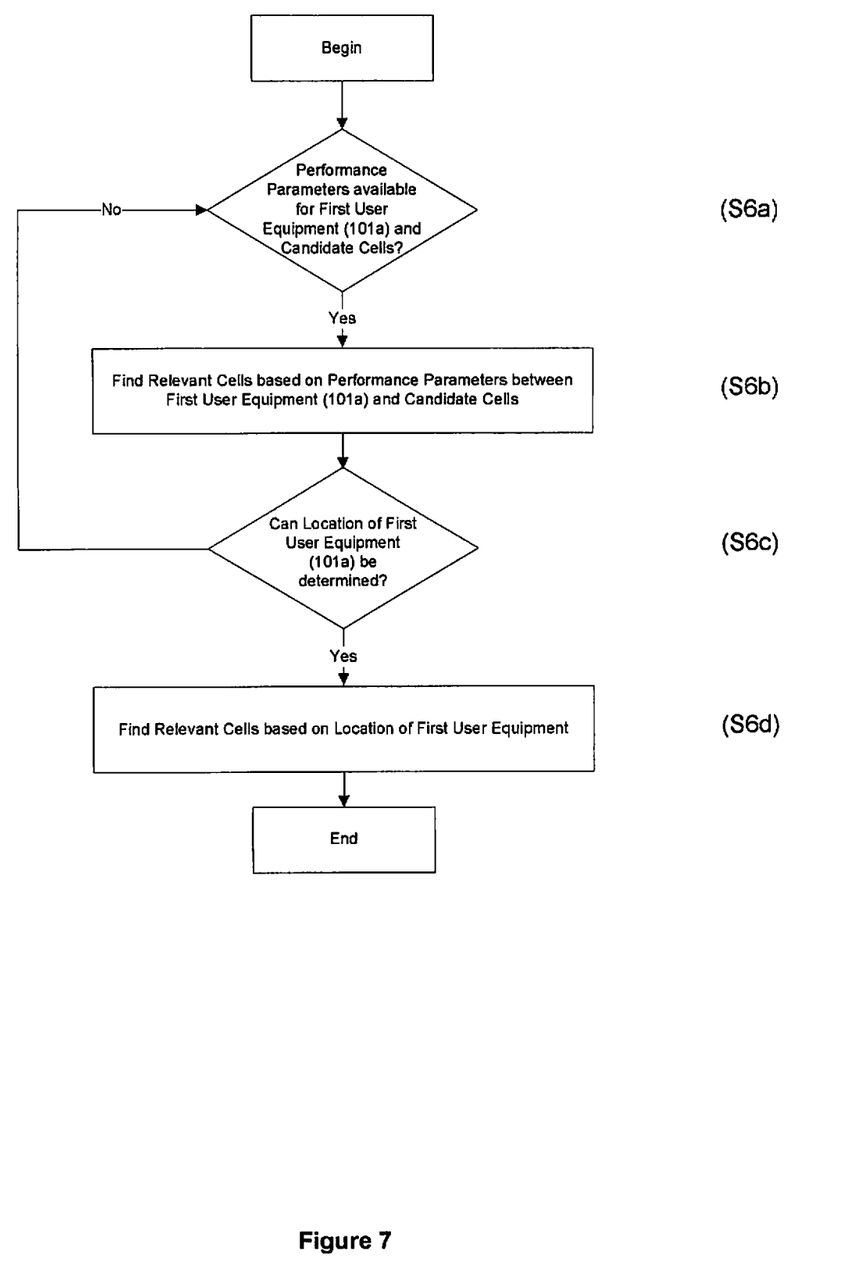
FIG. 7 is a flow diagram illustrating the steps of filtering the recommended plurality of cells.
Figure 8:
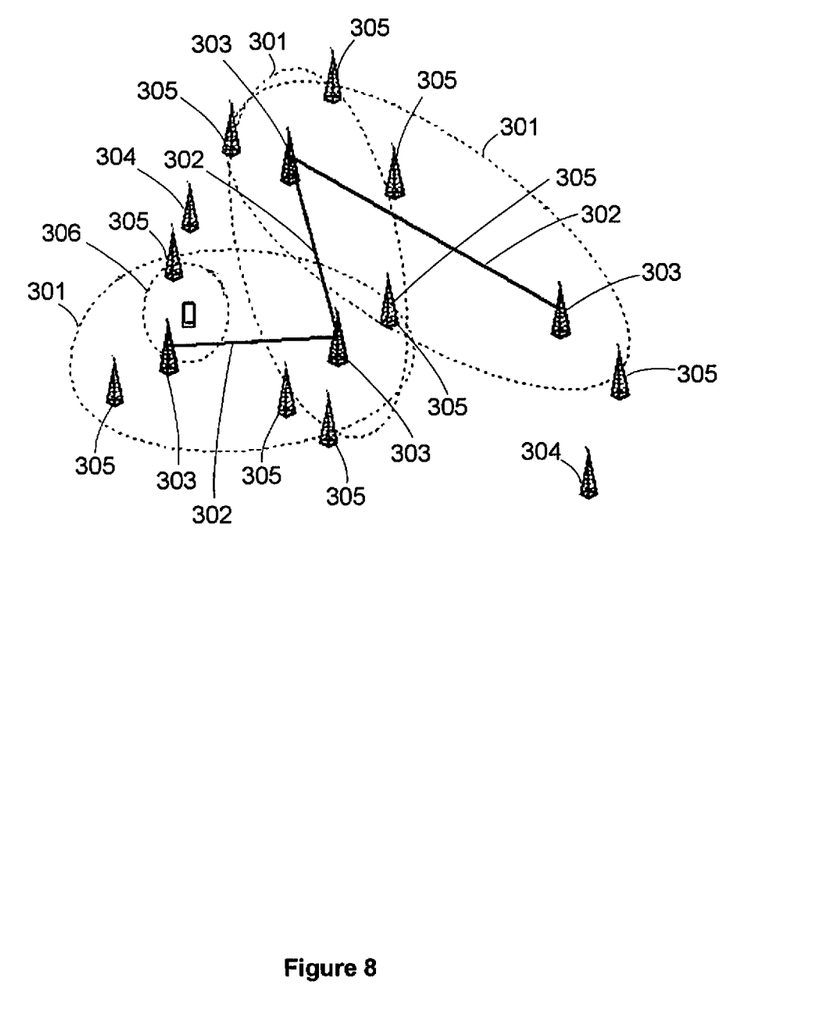
FIG. 8 is a schematic diagram illustrating the filtering process for a network node.

FIG. 7 illustrates the process of filtering the recommended plurality of cells, which is illustrated schematically in FIG. 8. As a first step (step S6*a*), the processor 11 determines whether calculated performance parameters are available between the first user equipment and the candidate cells in the recommended plurality of cells (i.e. determines whether there have been connections between the user equipment and cell before). In step S6*b*, the candidate cells are filtered to 'relevant cells' based on the following method. The first user equipment's travel path 302 is estimated as the path between cells with which the first user equipment has recently connected to (identified as cells 303). The travel path 302 is represented as a time based sequence. The first user equipment's recent active area 301 in the recent time period is estimated based on the first user equipment's travel path 302. In this embodiment, the recent active area 301 covers all points within a distance s around path 302 between each cell 303. Any cell within the current active area 301 is a 'relevant cell'.

In the next step (step S6c), the processor 11 checks if the first user equipment's location can be determined. If so, then a more accurate current active area 306 is determined (defined by a circle about said location having radius y). Any cell within the more accurate current active area 306 is then selected as a relevant cell.

The recommended plurality of cells is then filtered to include only the relevant cells (i.e. any cell which is not a relevant cell is deleted from the recommended plurality of cells). If the recommended plurality of cells is then empty, then the overall method returns to step S1, in which the connections between the plurality of user equipments and the plurality of cells are monitored.

The skilled person will understand that the filtering step is not an essential part of the present invention. However, it reduces the size of the PRL (which reduces the time taken to transmit the PRL, and the time for the first user equipment to search it) by removing any cells which the first user equipment is unlikely to connect to (such that the reduced list still maintains a good quality).

Furthermore, the skilled person will understand that it is not essential for the first user equipment 103a to perform conventional cell selection algorithms. Instead, the first user equipment may select the highest ranked cell from the recommended plurality of cells 103r. However, this invention compliments existing techniques such that existing cell selection algorithms may be used, which may further improve the suitability of the resulting cell selection for the first user equipment 103a.

The method involves several steps in which performance parameters are estimated or recommendations are based on similar user equipments/cells. The skilled person will understand that similarity may be based on any similarity measure, such as Correlation-based Similarity, Cosine-based Similarity, etc.

In the above embodiment, a recommend plurality of cells 103r (e.g. a list of recommended cells) is produced. However, the skilled person will understand that the method may only produce a single recommended cell based on a performance parameter of another user equipment.

The network node 10 described above is a standalone node including a communications link 13 with a support system of the network 1. The skilled person will understand that it is not necessary for the network node 10 to be a standalone element of the network. That is, the method may be implemented on any suitable part of the network. Advantageously, the method may be implemented on a support system node (such as SGSN, MME or OSS node), in which the node may already be performing cell/user equipment connection monitoring. If not, then the node may include a communication interface to receive such information (either through a wired or wireless connection), which may be by polling the user equipments, the user equipments reporting data to the network node 10, the network node 10 analysing failure reports, etc.

Furthermore, the step of influencing cell selection may be embedded in the Radio Network Controller, Base Station Controller, Hardware Node or Evolved Node B nodes.

The skilled person will also understand that it is not essential for the performance parameter to be connection reliability. That is, the performance parameter may be any suitable criterion (or KPI), and is readily adaptable such that the service provider may influence cell selection, for example, for load balancing purposes.

In the above embodiment, several steps aggregate performance parameters to form a single value. This may be achieved by any suitable statistical method, and weighted sum, regression are merely examples.

The skilled person will also realise that the above method may highlight if a particular cell is performing poorly. That is, if a particular cell is rarely recommended to user equipments, then the network operator may conclude that the cell requires optimization or attention (such identification may not be possible using existing methods).

The skilled person will also realise the method may be implemented into various types of mobile wireless telecommunications networks (e.g. GSM, WCDMA, LTE, etc.), regardless of the particular network architecture.

The skilled person will understand that any combination of feature is possible, without departing from the scope of the invention as claimed.

The invention claimed is:

1. A cell recommendation method of a network node in a communications network that includes a plurality of cells, the method comprising:
the network node performing:
obtaining performance parameters of a first selection of a plurality of user equipments, wherein each user equipment in the first selection of the plurality of user equipments has performance parameters with a plurality of candidate cells;
determining a recommended plurality of cells for a first user equipment, based on performance parameters of each of the plurality of user equipments with respect to each of the plurality of candidate cells;
ranking the recommended plurality of cells for the first user equipment according to similarity metrics generated by a similarity algorithm for each of the user equipments in the first selection of user equipments, wherein each respective similarity metric is an indication of a degree of performance-related similarity between the first user equipment and a respective one of the user equipments of the first selection of the plurality of user equipments; and
sending a ranked recommended plurality of cells list to the first user equipment for use in cell selection.

2. A method as claimed in claim 1, wherein the performance parameter for any one of the plurality of user equipments with respect to any one of the plurality of cells is a past performance parameter.

3. A method as claimed in claim 1, wherein the performance parameter for any one of the plurality of user equipments with any one of the plurality of cells is predicted.

4. A method as claimed in claim 1, wherein each user equipment in the first selection of the plurality of user equipments has performance parameters with at least five candidate cells.

5. A method as claimed in claim 1, wherein the first selection of the plurality of user equipments includes the ten most similar user equipments to the first user equipment.

6. A method as claimed in claim 1, further comprising the step of filtering the recommended plurality of cells according to the first user equipment's activity.

7. A method as claimed in claim 1, wherein the performance parameter decays at a predetermined rate.

8. A nontransitory computer-readable storage medium comprising computer executable code which when executed on a computer causes the computer to control a node in a communications network to perform a cell recommendation method, wherein the communications network includes a plurality of cells, and wherein the method comprises:

the network node performing:

obtaining performance parameters of a first selection of a plurality of user equipments, wherein each user equipment in the first selection of the plurality of user equipments has performance parameters with a plurality of candidate cells;

determining a recommended plurality of cells for a first user equipment, based on performance parameters of each of the plurality of user equipments with respect to each of the plurality of candidate cells;

ranking the recommended plurality of cells for the first user equipment according to similarity metrics generated by a similarity algorithm for each of the user equipments in the first selection of user equipments, wherein each respective similarity metric is an indication of a degree of performance-related similarity between the first user equipment and a respective one of the user equipments of the first selection of the plurality of user equipments; and sending a ranked recommended plurality of cells list to the first user equipment for use in cell selection.

9. A network node in a communications network that includes a plurality of cells, the network node comprising:

a processor configured to perform:

obtaining performance parameters of a first selection of a plurality of user equipments, wherein each user equipment in the first selection of the plurality of user equipments has performance parameters with a plurality of candidate cells;

determining a recommended plurality of cells for a first user equipment, based on performance parameters of each of the plurality of user equipments with respect to each of the plurality of candidate cells;

ranking the recommended plurality of cells for the first user equipment according to similarity metrics generated by a similarity algorithm for each of the user equipments in the first selection of user equipments, wherein each respective similarity metric is an indication of a degree of performance-related similarity between the first user equipment and a respective one of the user equipments of the first selection of the plurality of user equipments; and sending a ranked recommended plurality of cells list to the first user equipment for use in cell selection.

10. A network node as claimed in claim 9, wherein the performance parameter for any one of the plurality of user equipments with respect to any one of the plurality of cells is a past performance parameter.

11. A network node as claimed in claim 9, wherein the processor is configured for predicting the performance parameter for any one of the plurality of user equipments with any one of the plurality of cells.

12. A network node as claimed in claim 9, wherein each user equipment in the first selection of the plurality of user equipments has performance parameters with at least five candidate cells.

13. A network node as claimed in claim 9, wherein the first selection of the plurality of user equipments includes the ten most similar user equipments to the first user equipment.

* * * * *